US008145796B2

(12) United States Patent
Igarashi et al.

(10) Patent No.: US 8,145,796 B2
(45) Date of Patent: Mar. 27, 2012

(54) PRINTING CONTROL COMMANDS USING NATIVE PRINTER CODE

(75) Inventors: Tatsuya Igarashi, Kanagawa (JP); Makoto Sano, Kanagawa (JP); Ryuzo Sekiguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1273 days.

(21) Appl. No.: 11/882,405

(22) Filed: Aug. 1, 2007

(65) Prior Publication Data

US 2008/0130039 A1    Jun. 5, 2008

(30) Foreign Application Priority Data

Nov. 30, 2006   (JP) ................. 2006-324566

(51) Int. Cl.
G06F 3/00 (2006.01)
G06F 3/12 (2006.01)
G06K 9/00 (2006.01)
(52) U.S. Cl. ............... 710/5; 358/1.1; 382/100
(58) Field of Classification Search .......... None
See application file for complete search history.

(56) References Cited

U.S. PATENT DOCUMENTS

| 4,656,602 | A | 4/1987 | Berkland et al. | |
| 6,563,598 | B1 * | 5/2003 | Johnson et al. | 358/1.15 |
| 2002/0018233 | A1 | 2/2002 | Mori | |
| 2002/0129065 | A1 | 9/2002 | Shiohara | |
| 2006/0158688 | A1 | 7/2006 | Mori | |
| 2007/0247667 | A1 | 10/2007 | Mori | |

FOREIGN PATENT DOCUMENTS

| EP | 0 250 777 A2 | 1/1988 |
| JP | B2 3-78653 | 12/1991 |
| JP | B2 5-28849 | 4/1993 |
| JP | A 07-001793 | 1/1995 |
| JP | A 10-307693 | 11/1998 |
| JP | A-11-078168 | 3/1999 |
| JP | A-2001-328325 | 11/2001 |
| JP | A 2002-202869 | 7/2002 |
| JP | A-2003-333309 | 11/2003 |
| JP | A-2004-334579 | 11/2004 |

OTHER PUBLICATIONS

Office Action issued in Japanese Patent Application No. 2006-324566 dated Jul. 19, 2011 (with translation).

* cited by examiner

*Primary Examiner* — Alan Chen
(74) *Attorney, Agent, or Firm* — Oliff & Berridge, PLC

(57) ABSTRACT

An image processing system includes: a receiving section that receives print information including at least a first printing control command embedded in a print document and a second printing control command relating to a setting condition for the first printing control command; a control command extracting section that extracts the first printing control command and the second printing control command from the print information; and a print executing section that performs the first printing control command according to the setting condition of the second printing control command.

21 Claims, 13 Drawing Sheets

FIG. 7A
PAGE REGENERATION
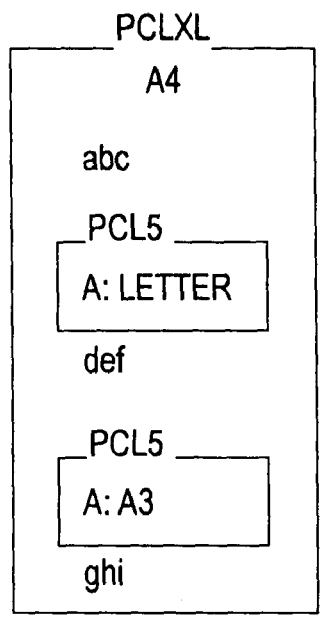
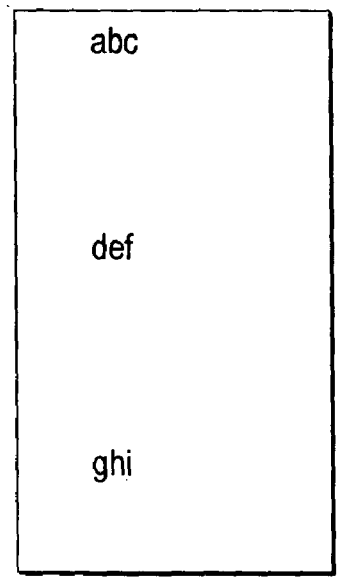
FIG. 7B
COMMAND DISREGARD
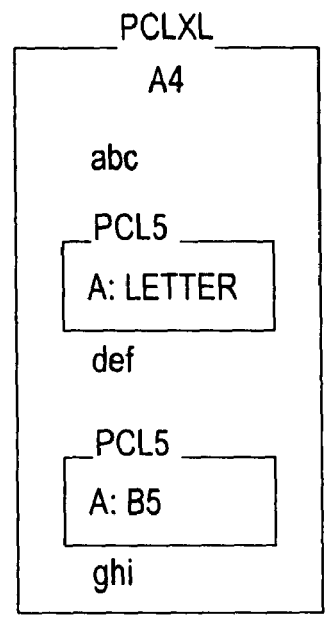
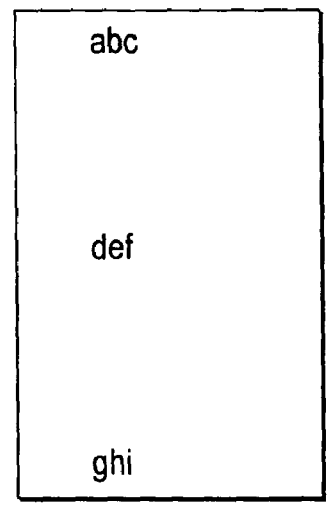

PRINTING CONTROL COMMANDS USING NATIVE PRINTER CODE

CROSS-REFERENCE TO RELATED APPLICATION

This application is based on and claims priority under 35 USC §119 from Japanese Patent Application No. 2006-324566 filed Nov. 30, 2006.

BACKGROUND (i) Technical Field

The present invention relates to an image processing system, an image processing method, an information processing system, an information processing method and a computer readable medium.

(ii) Related Art

In addition to control methods and image processing apparatus which control various print functions according to commands of a printer control language, image processing apparatus are known which are configured so as to be able to perform a function (what is called passthrough processing) that makes it possible to directly control the image processing apparatus without requiring a user to make setting using a printer driver by embedding commands passed from an application in print information at the time of printing of a document.

When printing is performed by passthrough processing, information such as a text is sent to an image processing apparatus but is not displayed on the screen which is used for generation of a document.

SUMMARY

According to an aspect of the invention, there is provided an image processing system comprising:

a receiving section that receives print information including at least a first printing control command embedded in a print document and a second printing control command relating to a setting condition for the first printing control command;

a control command extracting section that extracts the first printing control command and the second printing control command from the print information; and a print executing section that performs the first printing control command according to the setting condition of the second printing control command.

BRIEF DESCRIPTION OF THE DRAWINGS

Exemplary Embodiments of the present invention will be described in detail based on the following figures, wherein:

FIGS. 7A and 7B are explanatory diagrams showing print outputs of the customization-mode process;

Figure 1:
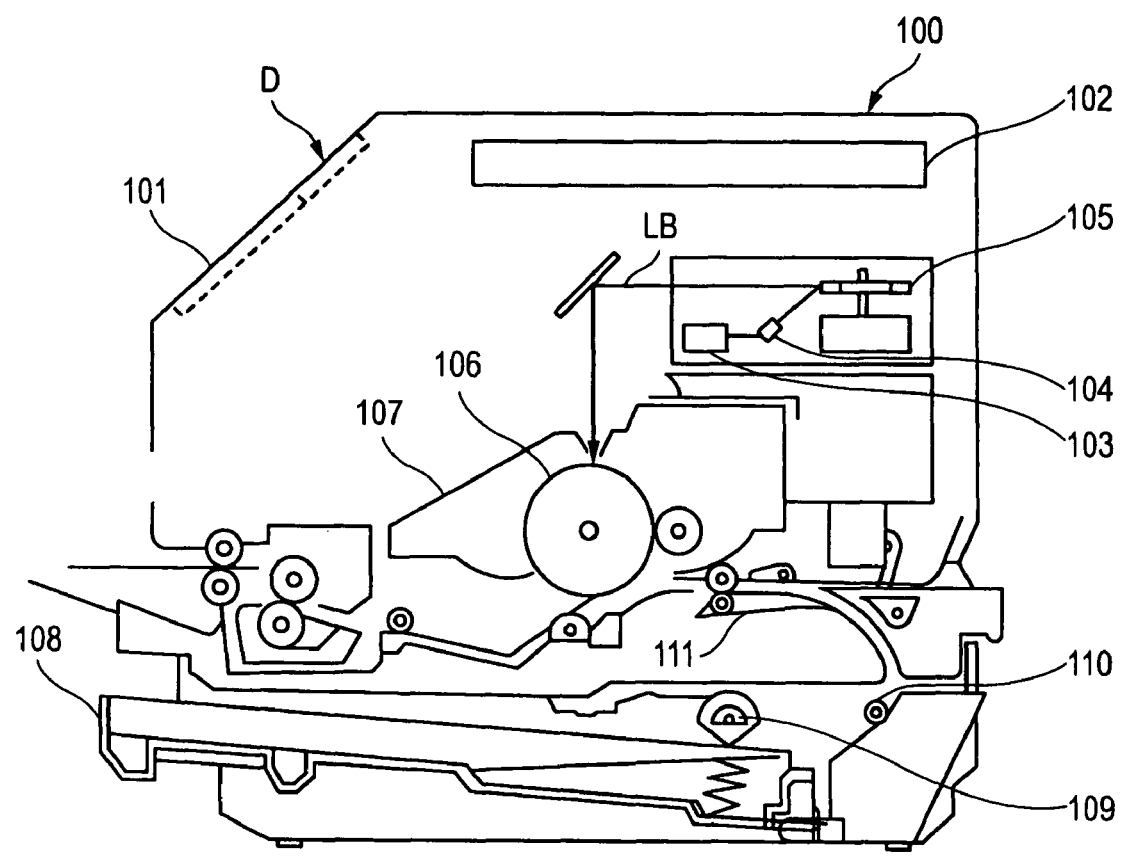
FIG. 1 is a block diagram showing the configuration of a laser printer as an image processing apparatus according to an exemplary embodiment of the invention.

Reference numerals and signs in the drawings are set forth below.

100: Laser printer (image processing apparatus)
101: Operating panel
102: Printer controller
1021: CPU
1022: Input interface
1025: PDL1 processing device (control command extracting section)
1026: PDL2 processing device (control command extracting section)
103: Laser driver
104: Semiconductor laser
105: Rotary polygon mirror
106: Electrostatic drum
107: Developing unit
108: Sheet cassette
109: Sheet feed roller
110: Transport roller
111: Transport roller
200: Network
A1-A5: Display areas
B: Internal bus
C1-C3: Check boxes
D: Liquid crystal panel
E: Printer engine (print executing section)
PC: Information processing apparatus
500: Operating/display panel
501: Transmission device

DETAILED DESCRIPTION

Exemplary embodiments of the present invention will be hereinafter described in detail with reference to the drawings. The same components are given a common symbol in the accompanying drawings and will not be described redundantly. The following description will be directed to the best mode for carrying out the invention, and hence the invention is not limited to it.

A laser printer 100 as an image processing apparatus according to an exemplary embodiment of the invention receives and stores print information (character codes, control commands, etc.), form information, macro commands, etc. supplied from an externally connected information processing apparatus such as a personal computer or a host computer PC, generates character patterns, a form pattern, etc. according to those pieces of information, and forms an image (a text, a picture, etc.) on a print sheet or the like as a print medium.

An operating panel 101 in which manipulation switches, a liquid crystal display panel D, etc. are arranged occupies a top surface portion of the laser printer 100.

A printer controller 102 which controls the entire laser printer 100 and analyzes text information etc. supplied from the host computer or the like is disposed inside the laser printer 100. The printer controller 102 mainly converts text information into a video signal of corresponding character patterns and outputs the latter to a laser driver 103.

The laser driver 103, which is a circuit for driving a semiconductor laser 104, on/off-switches laser light LB emitted from the semiconductor laser 104 according to the received video signal.

The laser light LB emitted from the semiconductor laser 104 is deflected in the right-left direction by a rotary polygon mirror 105. The surface of an electrostatic drum 106 is thereby scanned with and exposed to the laser light LB, whereby an electrostatic latent image of character patterns or a picture is formed on the electrostatic drum 106.

The electrostatic latent image is developed by a developing unit 107 which is disposed around the electrostatic drum 106, and then transferred to a print sheet which is a cut sheet. The cut print sheet contained in a sheet cassette 108 which is attached to the laser printer 100 is taken into the apparatus by means of a sheet feed roller 109 and transport rollers 110 and 111 and supplied to the electrostatic drum 106.

Although the invention is not limited to it, the laser printer 100 may be configured so as to be provided with at least one card slot (not shown) so that an option font card and a control card (emulation card) for a different print control language can be connected to the laser printer 100 to enable use of fonts other than built-in fonts.

The image processing apparatus to which the invention can be applied is not limited to a laser printer to which the embodiment is directed, and may be any of various kinds of printers such as a full-color printer and an ink-jet printer. Although this embodiment is directed to the laser printer as an image processing apparatus, the image forming apparatus according to the invention is not limited to laser printers and includes facsimile machines etc.

A passthrough function will now be described. For example, Windows which is an operating system (OS) of Microsoft Corporation, Word (trademark of Microsoft Corporation) which is wordprocessor software that runs on this OS, etc. have, as one of application functions, a passthrough function (passthrough command processing function).

For example, an application can pass data directly to a printer (printing apparatus) using an API Escape( ) function which is a passthrough command. Where a printer driver supports passthrough printer escape (herein after referred to simply as "passthrough"), a native printer language code (e.g., native PCL code) can be transmitted to the printer driver by using the Escape( ) function and the passthrough.

In Windows, the above-mentioned Escape( ) function is provided to support functions specific to a printer that cannot be completely supported by image drawing functions of GDI (graphic device interface; this is one of programs provided in Windows and serves to control a printer and a display). The passthrough which is a function for outputting a printer code directly to a printer exists in it.

The passthrough has a function of permitting transmission of data directly to a printer in the case where an application is not using a standard printer driver. That is, data of a spool file image (printer control code image) can be generated inside an application and output directly to a printer by using the passthrough function.

More specifically, it is possible to insert a print field into the text of a document generated by Word, for example, and transmit a prescribed command to a printer. The command is transmitted to the printer as a native printer language code.

For example, when data is embedded in a particular field in a document, that field is not image-drawn and embedded, as passthrough data, in a print file (print information) which will be transmitted to a printer.

The specification is such that if a graph, a formula, or the like is embedded in a document or data generated by another application is inserted into a document (i.e., embedding of an object), the inserted data is made part of the document. And if the object is altered, the document comes to reflect the alteration.

Native printer language codes (mentioned above) are executed in order of their insertion positions in a document.

The configuration of a control system of the laser printer 100 according to the embodiment will be described below with reference to FIG. 2.

The printer controller 102 which serves as the control system of the printer 100 is composed of the following components which are connected to each other via an internal bus B. The components are a CPU 1021 which performs various kinds of computation processing and other processing, an input interface (input I/F; receiving section) 1022 which receives print information (containing at least one of first printing control commands according to a prescribed printer control language and second printing control commands in which a setting element is added to the first printing control commands) and other information from an external apparatus, a RAM 1023 which temporarily stores print information and also functions as a work area for computation processing, a ROM 1024 which stores programs for execution of a print control process and other processes, various data, etc., a PDL1 processing device 1025 and a PDL2 processing device 1026 which constitute a control command extracting section for performing processing according to a page-description language (PDL) and extracting first printing control commands and second printing control commands contained in print information as well as a passthrough processing control section, and a printer engine interface (printer engine I/F) 1027 which exchanges control information etc. with a printer engine (print executing section) E.

Embodiments of the page-description language (PDL) are PCL (e.g., PCLXL100, PCL5, PCL6, etc.), PostScript (trademark of Adobe Systems Incorporated), LIPS (trademark of Canon Inc.), ESC/Page (trademark of Seiko Epson Corporation), and PRESCRIBE (trademark of Kyocera Corp.). This embodiment will be directed to a case of using PCL5.

In the laser printer 100 according to the embodiment, the printer engine E means all of the mechanisms which perform printing actually such as the laser driver 103, the semiconductor laser 104, the electrostatic drum 106.

The CPU 1021 may be a one-chip microcomputer or the like.

Figure 2:
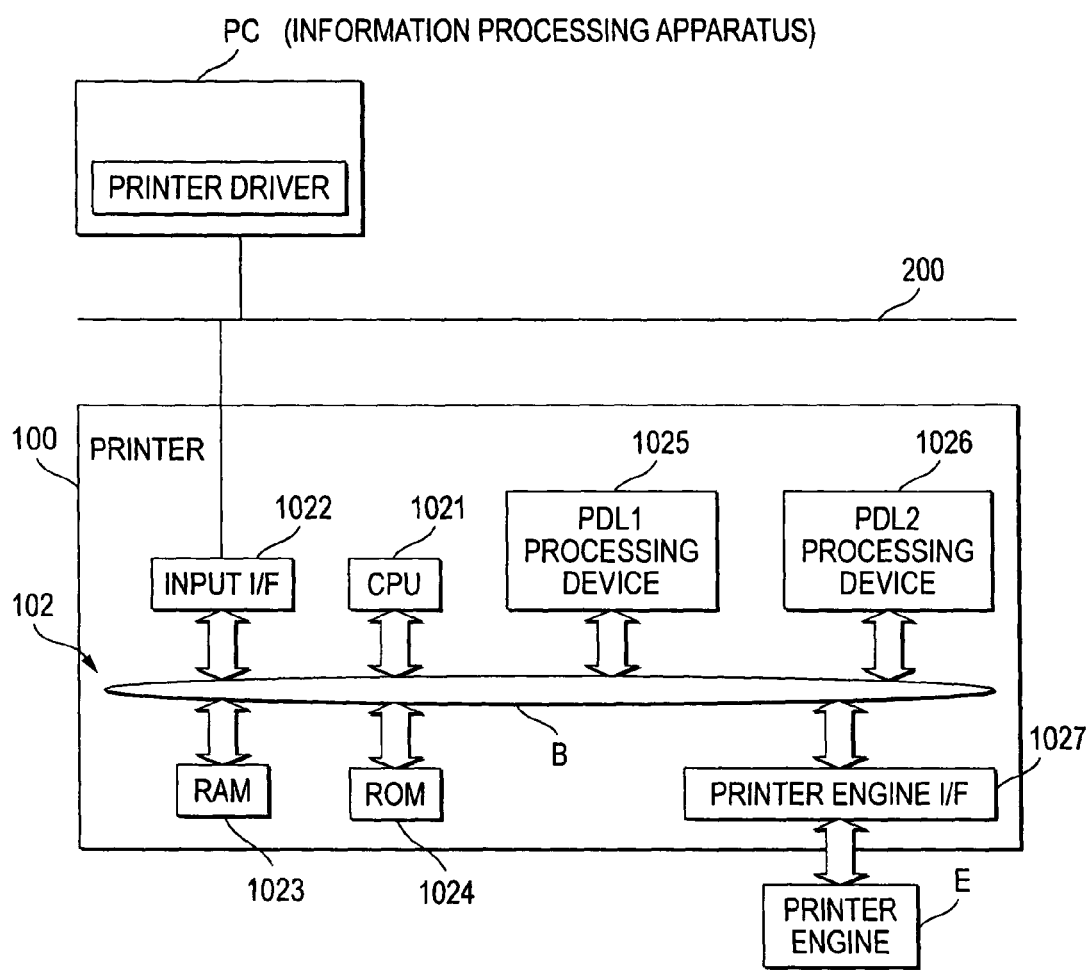
FIG. 2 is a block diagram showing the configuration of a control system of the laser printer according to the embodiment.

In the embodiment of FIG. 2, the input interface 1022 is connected to the host computer PC or the like incorporating printer drivers via a network 200 (e.g., a LAN). The manner of connection between the laser printer 100 and the host computer PC or the like is not limited to the method using the network 200, and includes a case that the laser printer 100 is connected to a personal computer or the like one to one via a printer cable or the like. Although this embodiment employs the network 200 as an exemplary communication section, other communication section may be used.

Next, an embodiment of a print control process which is executed by the printer controller 102 which is the control system of the laser printer 100 according to the embodiment will be described with reference to FIGS. 3-12.

First, a display embodiment of the liquid crystal display panel D which serves as a list display and a control command forming section will be described with reference to FIG. 3. Although the invention is not limited to it, the ease of operation of a user can be increased if the liquid crystal display panel D is made a pressure-sensitive touch panel and thereby enables direct input (selection) by a finger, a stylus pen, or the like. A prescribed input button (selection button) or the like may be disposed near the liquid crystal display panel D.

Although in this embodiment the liquid crystal display panel D is provided in the laser printer 100, the invention is not limited to such a case and encompasses a case that necessary information is displayed on the information processing apparatus such as a personal computer.

Now, with reference to FIG. 13, a description will be made of a configuration that is employed in the case where necessary information is displayed on and a manipulation is performed through the information processing apparatus.

Components having corresponding components in FIG. 2 will be given the same symbols as the latter and will not be described redundantly.

Figure 13:
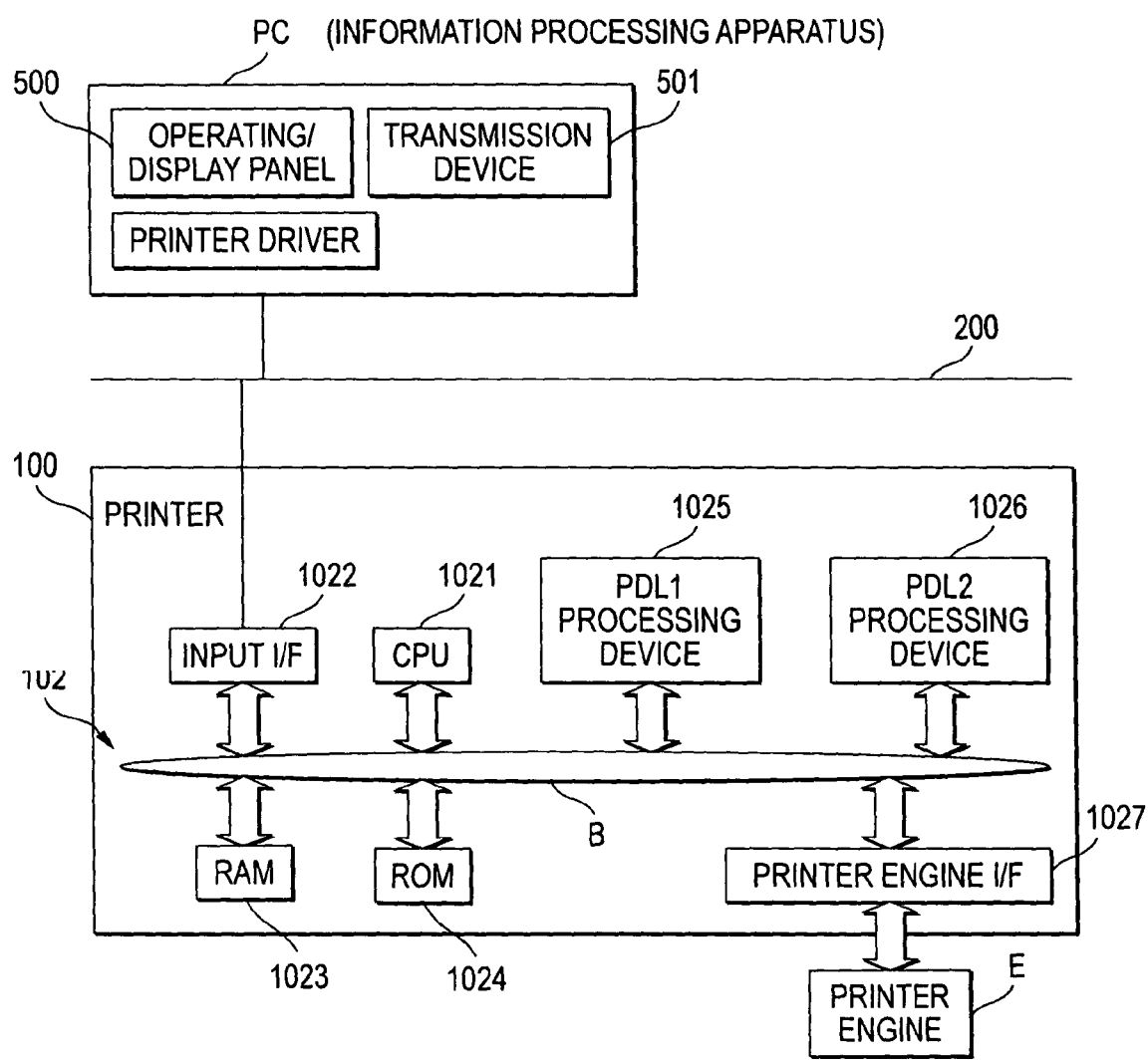
FIG. 13 is a block diagram showing the configuration of a control system of a laser printer according to another exemplary embodiment.

The configuration of FIG. 13 is different from that of FIG. 2 in that the information processing apparatus PC is provided with, in addition to the printer drivers, an operating/display panel 500 such as a touch-type liquid crystal panel and a transmission device 501 such as a modem. Instead of providing the operating/display panel 500, it is possible to display necessary information on a monitor for a personal computer and to perform a setting manipulation using a keyboard and a pointing device such as a mouse that are connected to the personal computer.

In this configuration, list display, setting display, and a setting manipulation are performed by using the operating/display panel 500 or the like of the information processing apparatus PC and a control command thus set is transmitted to the laser printer 100 via the transmission device 501.

Now, to simplify the description, a manner of display on the liquid crystal display panel D (or the operating/display panel 500) will be described in such a manner that it is divided into display are as A1-A5.

First, a sentence M1 "Use the passthrough customization mode" is displayed in the display are a A1 which is located at the top of the liquid crystal display panel D. And a check box C1 is displayed on the left of the sentence M1. This function can be turned on or off by checking the check box C1 or leaving it blank.

The "passthrough customization mode" means a mode in which a user of the printer (or a document generator or the like who is going to perform printing) sets, for each of various ordinary control commands (first printing control commands, standard commands; described later) according to PCL5 as a prescribed printer control language, a second printing control command (customized command) relating to parameters (setting elements) such as use/non-use (on/off), an effective range, and a command operation.

Information indicating whether or not the setting elements should be applied may be added to each second printing control command (customized command).

Figure 3:
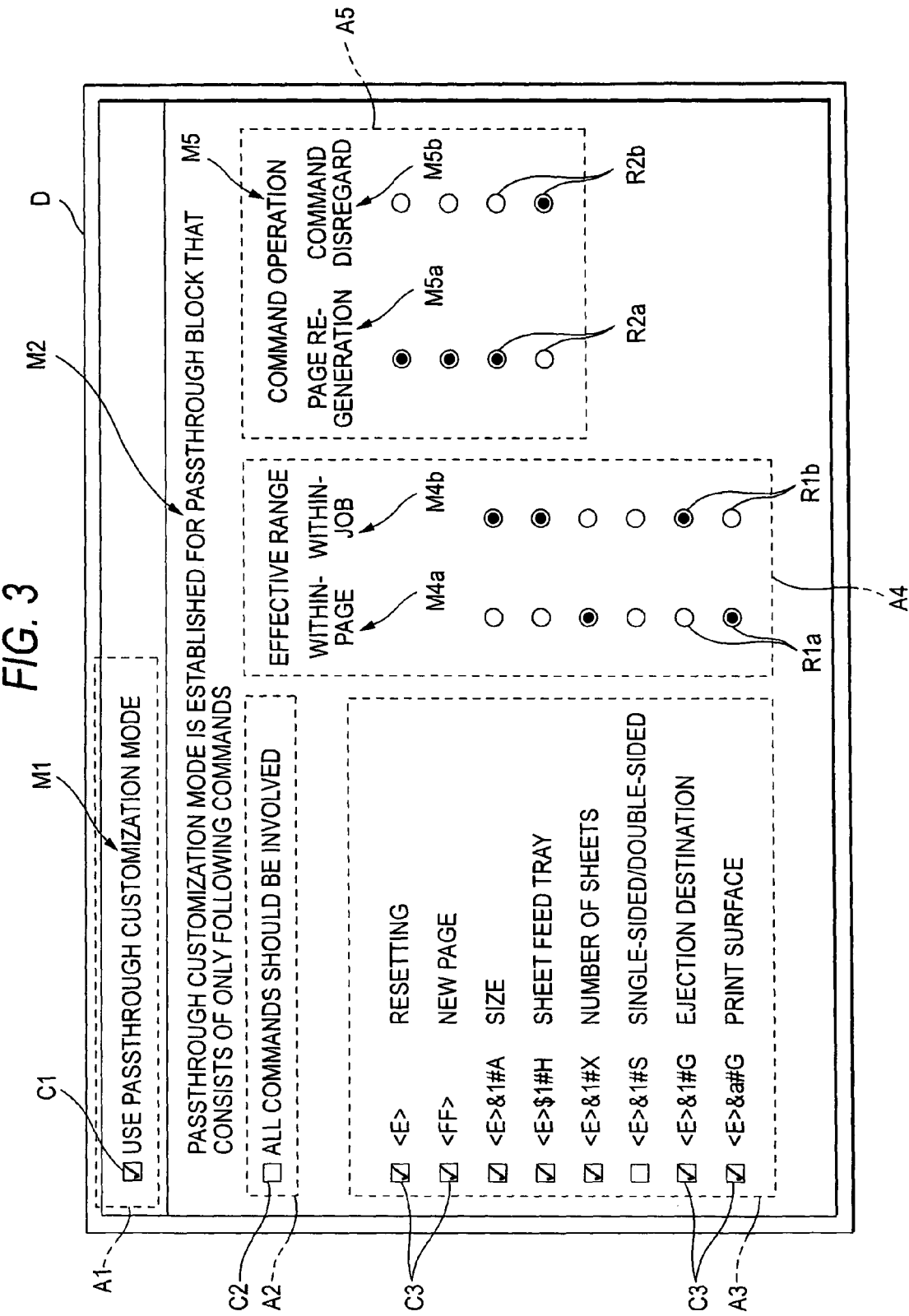
FIG. 3 is an explanatory diagram showing a display embodiment of a liquid crystal display panel.

If the check box C1 is checked (as shown in FIG. 3), the passthrough customization mode is made effective and a print control process is executed according to second printing control commands (customized commands) that are formed according to a procedure that will be described later. On the other hand, if the check box C1 is not checked, a print control process is executed according to ordinary control commands (ordinary commands) contained in print information.

A sentence M2 "The passthrough customization mode is established for a passthrough block that consists of only the following commands" is displayed under the display are a A1, which is a brief description for a user or the like.

The display are a A2 is provided under, obliquely on the left of the sentence M2, and a sentence M3 "All commands should be involved" is displayed there. And a check box C2 is displayed on the left of the sentence M3. This function can be turned on or off by checking the check box C2 or leaving it blank. If the check box C2 is checked, all of check boxes C3 in the display are a A3 (described later) are checked automatically. In this display embodiment, the check box C2 is not checked (i.e., this function is in the off state), which means a state that the commands in the display are a A3 are selected individually.

The display are a A3 is provided right under the display are a A2, and a list of eight PCL5 ordinary control commands are displayed there so as to be arranged vertically. More specifically, the list consists of eight control commands which are "<E> (Designation of) resetting," "<FF> (Designation of) newpage," "<E>&l#A (Designation of) size," "<E>&l#H (Designation of) sheet feed tray," "<E>&l#X (Designation of) the number of sheets," "<E>&l#S (Designation of) single-sided/double-sided," "<E>&l#G (Designation of) ejection destination," and "<E>&a#G (Designation of) print surface." A check box C3 is displayed on the left of each control command, and each command function can be turned on or off by checking the associated check box C3 or leaving it blank. In this embodiment, the check boxes C3 other than the one corresponding to the third (from the bottom) command "<E>&l#S Single-sided/double-sided" are checked.

The list display of this embodiment is just an example, and another ordinary control command may be added to the list so as to be selected. A prescribed control command may be removed from the list. Furthermore, the layout of the list of this embodiment is just an example and may be in another form.

The display are a A4 is provided on the right of the display are a A3, and a phrase M4 "Effective range" is displayed as a title at the top of the display are a A4. A phrase M4*a* "Within page" is displayed as a selection item (setting element or parameter) under, obliquely on the left of the phrase M4. And radio buttons R1*a* that are correlated with the above-mentioned respective control commands excluding "<E> Resetting" and "<FF> New page" and can be selected independently are displayed under the phrase M4*a*.

The term "Within page" means that the effective range of a selected command is the page concerned of one or more pages that constitute received print information.

A phrase M4*b* "Within job" is displayed as a selection item under, obliquely on the right of the phrase M4. And radio buttons R1*b* that are correlated with the above-mentioned respective control commands excluding "<E> Resetting" and "<FF> New page" and can be selected independently are displayed under the phrase M4*b*.

The term "Within job" means that the effective range of a selected command is the whole of received print information.

Each pair of radio buttons R1*a* and R1*b* that are opposite to each other in the right-left direction can be checked exclusively; that is, a dot-shaped check mark can be input to only selected one of each pair of radio buttons R1*a* and R1*b*.

In this embodiment, "Within page" is selected as an effective range for the control commands "<E>&l#X The number of sheets" and "<E>&a#G Print surface", and "Within job" is selected as an effective range for the control commands "<E>&I#A Size," "<E>&I#H Sheet feed tray," and "<E>&I#G Ejection destination." Neither of the effective range selection items can be selected for "<E>&I#S Single-sided/double-sided" which is not selected in the display area a A3.

The display area A5 is provided on the right of the display area A4, and a phrase M5 "Command operation" is displayed as a title at the top of the display area a A5. A phrase M5a "Page regeneration" is displayed as a selection item (setting element or parameter) under, obliquely on the left of the phrase M5. And radio buttons R2a that are correlated with the respective control commands "<E> Resetting," "<FF> New page," "<E>&I#A Size," and "<E>&I#H Sheet feed tray" and can be selected independently are displayed under the phrase M5a.

The term "Page regeneration" means an operation of regenerating print information on the basis of selected control commands.

A phrase M5b "Command disregard" is displayed as a selection item under, obliquely on the right of the phrase M5. And radio buttons R2b that are correlated with the respective control commands "<E> Resetting," "<FF> New page," "<E>&I#A Size," and "<E>&I#H Sheet feed tray" and can be selected independently are displayed under the phrase M5b.

The term "Command disregard" means an operation of forcibly disregarding a selected control command.

Each pair of radio buttons R2a and R2b that are opposite to each other in the right-left direction can be checked exclusively; that is, a dot-shaped check mark can be input to only selected one of each pair of radio buttons R2a and R2b.

In this embodiment, "Page regeneration" is selected for the control commands "<E> Resetting," "<FF> New page," and "<E>&I#A Size", and "Command disregard" is selected for the control command "<E>&I#H Sheet feed tray."

As for the command operation, the apparatus may be configured so that selection between "Page regeneration" and "Command disregard" can also be made for the control commands "<E>&I#X the number of sheets," "<E>&I#S Single-sided/double-sided," "<E>&I#G Ejection destination," and "<E>&a#G Print surface."

Second printing control commands (customized commands) which reflect the intention of a user or the like are set by selecting prescribed control commands and prescribed parameters (setting elements).

Now, the details of the second printing control commands (customized commands) that are formed in this embodiment will be described below in a rearranged manner:

(1) If print information contains the control command "<E> Resetting" or "<FF> New page," page regeneration processing is performed.

(2) If print information contains the control command "<E>&I#A Size," page regeneration processing is performed with the job selected as an effective range.

(3) If print information contains the control command "<E>&I#H Sheet feed tray," command disregard processing is performed with the job selected as an effective range.

(4) If print information contains the control command "<E>&I#X the number of sheets" or "<E>&a#G Print surface," processing is performed with the page concerned selected as an effective range.

(5) If print information contains the control command "<E>&I#S Single-sided/double-sided," an ordinary control process is executed.

(6) If print information contains the control command "<E>&I#G Ejection destination," processing is performed with the job selected as an effective range.

The standard commands (first printing control commands) are executed according to the parameters (setting elements) of the second printing control commands (customized commands) which reflect the intention of a person who generated a document or some other person.

Figure 4:
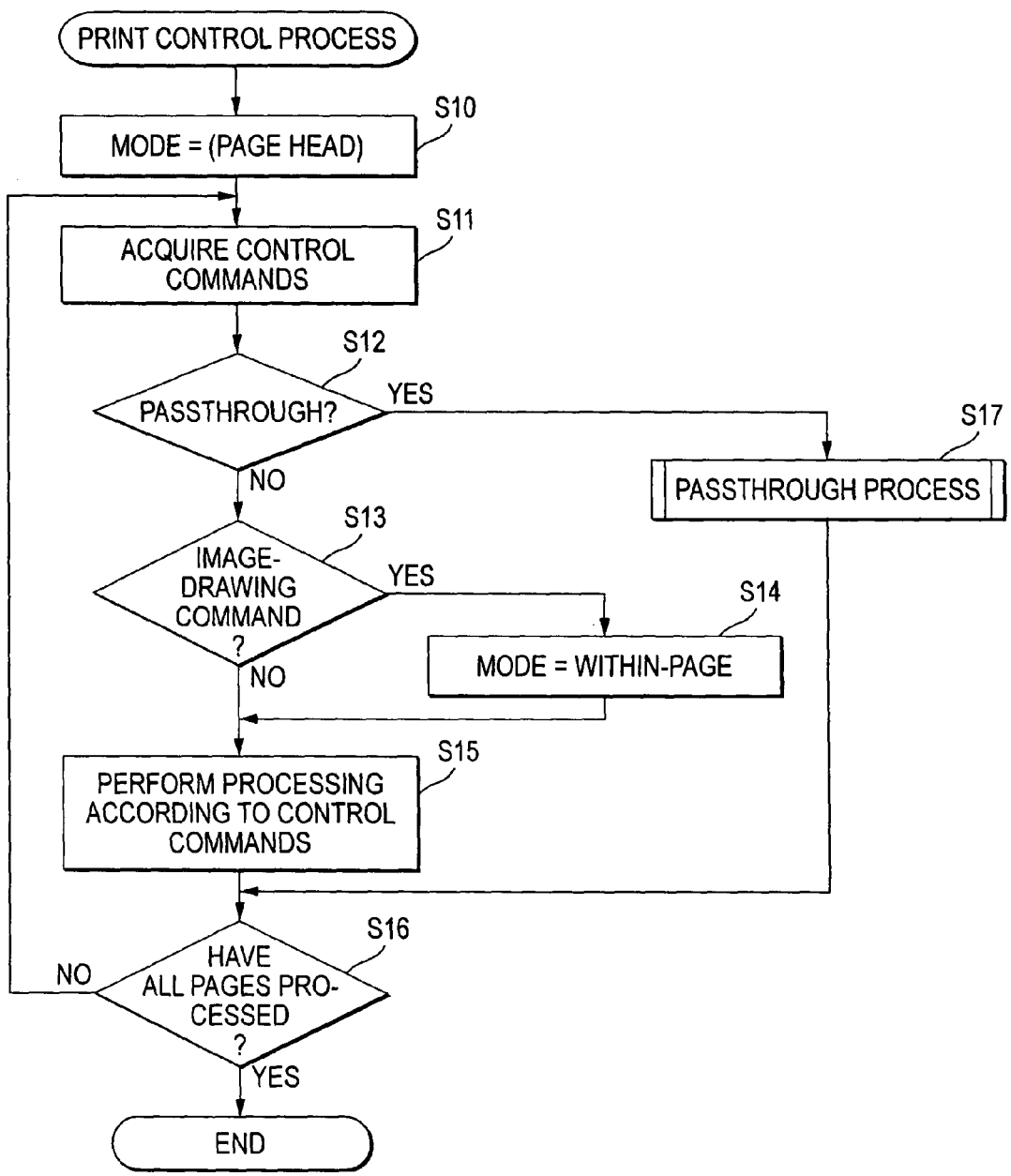
FIG. 4 is a flowchart showing the processing procedure of a print control process.
Figure 5:
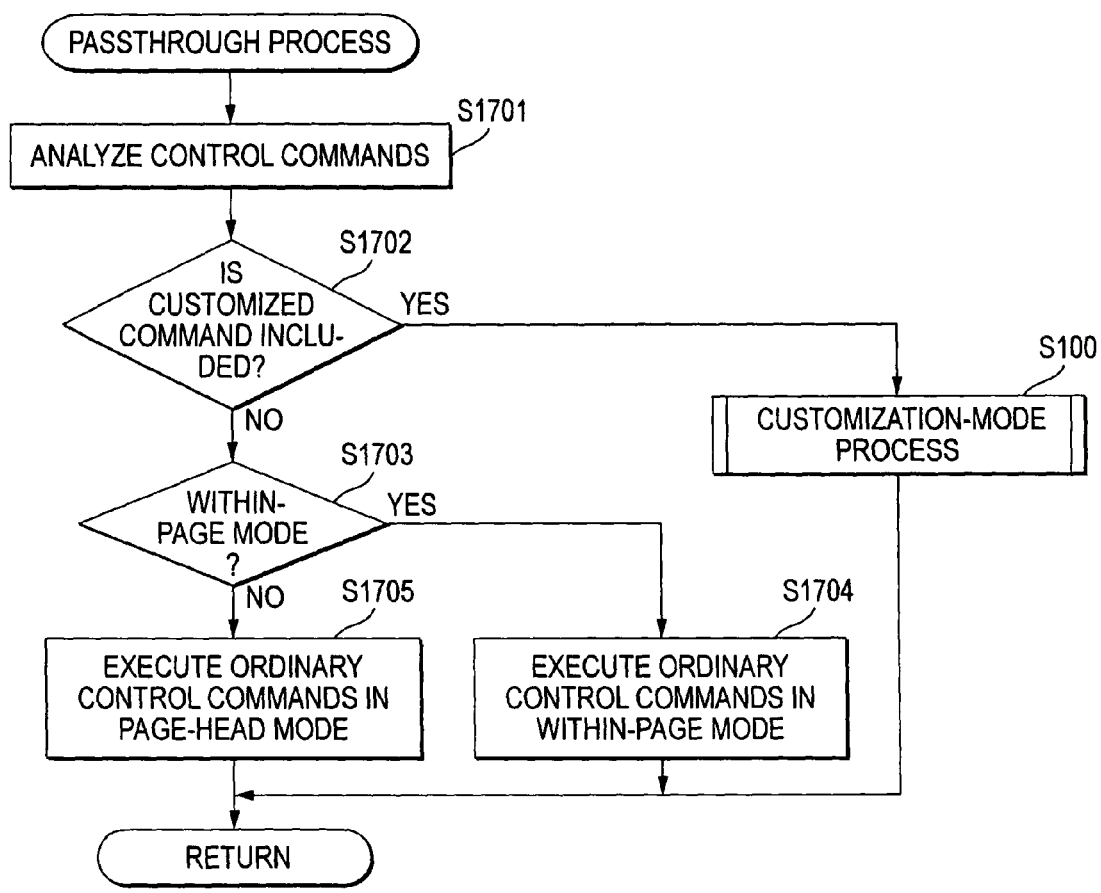
FIG. 5 is a flowchart showing the processing procedure of a subroutine of a passthrough process.
Figure 6:
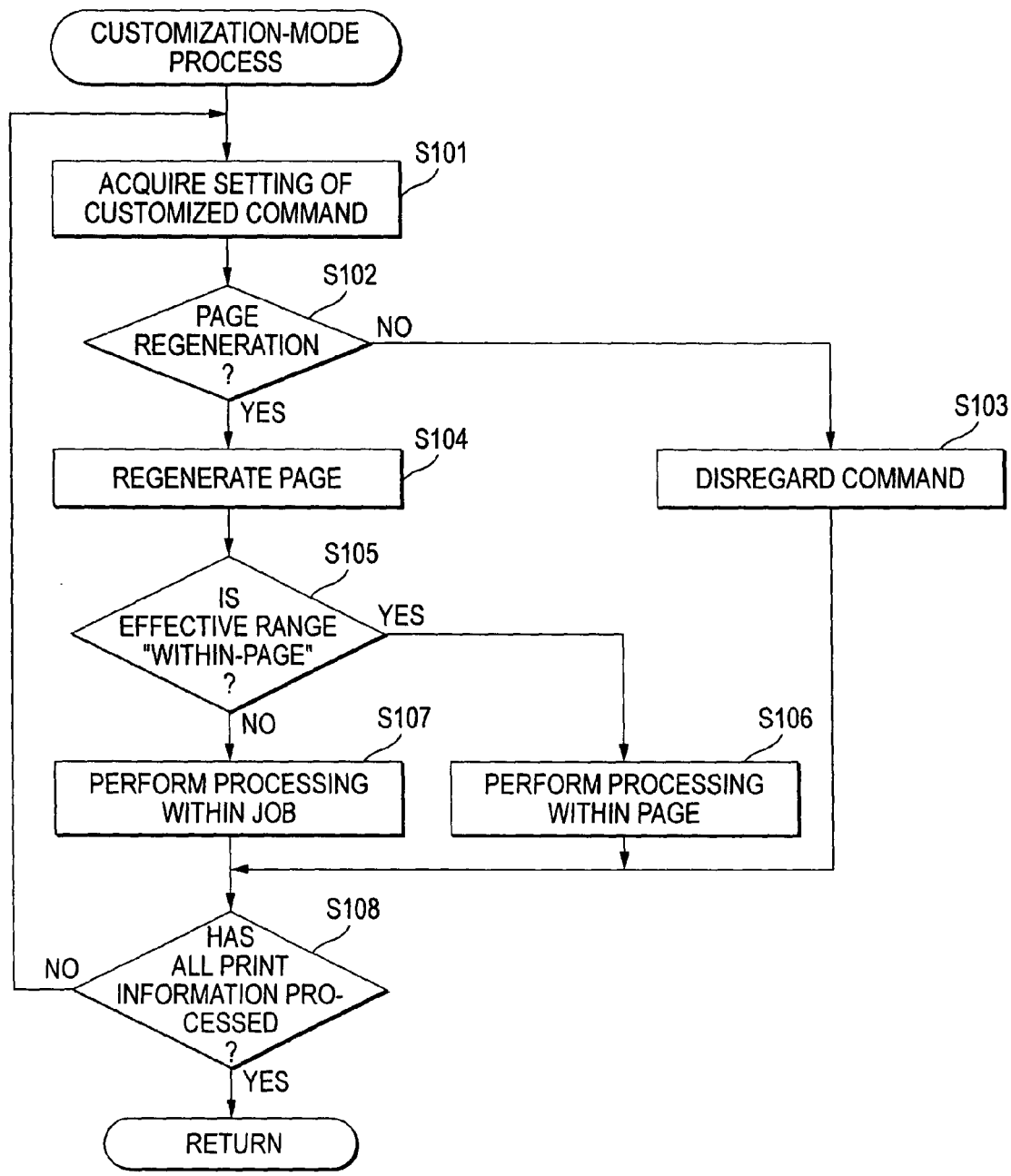
FIG. 6 is a flowchart showing the processing procedure of a subroutine of a customization-mode process.

Next, the processing procedure of a print control process that is executed according to second printing control commands (customized commands) that are formed in the above-described manner and print information containing ordinary control commands will be described with reference to flowcharts of FIGS. 4-6.

Upon a start of the print control process, at step S10, the mode is set to a page-head mode. Then, the process moves to step S11.

At step S11, print information is parsed and control commands are acquired. Then, the process moves to step S12, where whether or not a passthrough process needs to be executed is judged on the basis of the contents of the acquired control commands. If it is judged that a passthrough process need not to be executed (i.e., an ordinary process should be performed), the process moves to step S13.

At step S13, it is judged whether or not the acquired control commands include an image-drawing command. If the judgment result is "yes," the process moves to step S14, where the mode is set to a within-page mode. Then, the process moves to step S15. If the judgment result is "no," the process moves to step S15 without changing the mode.

At step S15, processing is performed according to the acquired control commands. Then, the process moves to step S16, where it is judged whether or not all pages have been processed. If the judgment result is "yes," the process is finished. If the judgment result is "no," the process returns to step S11 to continue similar processing until all pages are processed.

If it is judged at step S12 on the basis of the contents of the acquired control commands that a passthrough process needs to be executed, the process moves to step S17, where a subroutine of a passthrough process is executed.

Now, the processing procedure of the passthrough process will be described with reference to a flowchart of FIG. 5.

Upon a start of the passthrough process, at step S1701, the control commands that were acquired at step S11 are analyzed. Then, the process moves to step S1702.

At step S1702, it is judged whether or not the control commands include a second printing control command (customized command), that is, whether or not they include only ordinary control commands. If the control commands do not include a second printing control command and hence include only ordinary control commands, the process moves to step S1703.

At step S1703, it is judged whether or not the mode is the within-page mode. If the judgment result is "yes," the process moves to step S1704, where the ordinary control commands are executed in the within-page mode. Then, the process returns to the print control process of FIG. 4. If the judgment result is "no," the process moves to step S1705, where the ordinary control commands are executed in the page-head mode. Then, the process returns to the print control process of FIG. 4. The within-page mode is a mode that is employed in the case where control commands are written at certain positions in a page of a document and in which those commands are disregarded. On the other hand, the page-head mode is a mode that is employed in the case where control commands are written at the head of a page of a document and in which processing is performed according to those commands.

On the other hand, if it is judged at step S1702 that the control commands include a second printing control command, the process moves to step S100, where a subroutine of a customization-mode process is executed.

Now, the processing procedure of the customization-mode process will be described with reference to a flowchart of FIG. 6.

Upon a start of the customization-mode process, at step S101, the second printing control command (customized command) that was analyzed at step S1701 is acquired. Then, the process moves to step S102.

At step S102, it is judged whether or not a page regeneration parameter is set in the acquired second printing control command. If the judgment result is "no," the process moves to step S103, where processing of disregarding the command forcibly is performed. Then, the process moves to step S108. As a result, if the sheet size "letter" or "B5" is designated by passthrough, it is disregarded forcibly and a printing is produced on an A4-size sheet (see FIG. 7B). If it is judged at step S102 that a page regeneration parameter is set, the process moves to step S104, where a page is regenerated. Then, the process moves to step S105.

As a result, as shown in FIG. 7A, a page is regenerated according to the control commands and the last size designation (in this embodiment "A3") is made effective. At step S105, it is judged whether or not the parameter "Within-page" is set as a control command effective range. If the judgment result is "yes," the process moves to step S106, where the control commands are executed within the page. Then, the process moves to step S108. If the judgment result is "no," the process moves to step S107, where processing is performed according to the control commands within the job (entire print information). Then, the process moves to step S108.

At step S108, it is judged whether or not all the print information has been processed. If it is judged that all the print information has been processed, the process returns to the passthrough process of FIG. 5. If it is judged that not all of the print information has been processed, the process returns to step S101 to continue similar processing until all the print information is processed.

Figure 8:
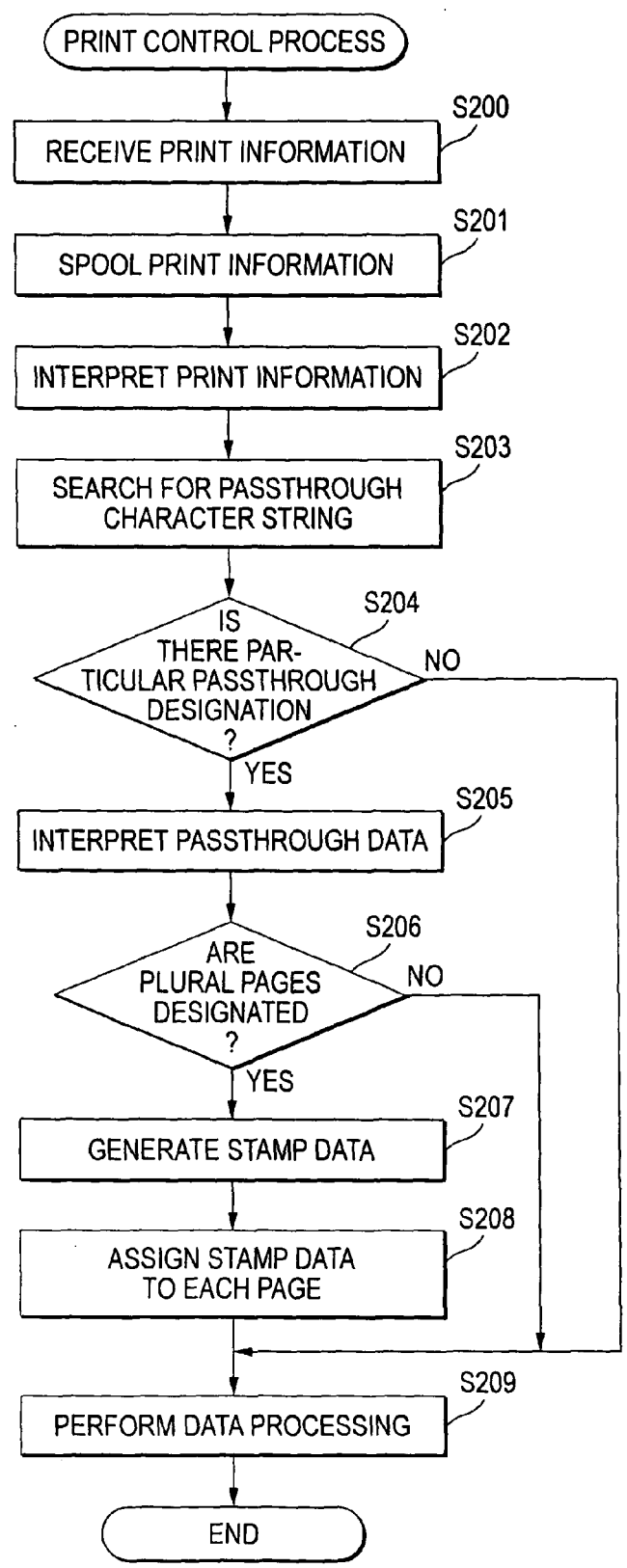
FIG. 8 is a flowchart showing the processing procedure of another print control process.

Next, the processing procedure of a print control process in which a selected first printing control command continues to be executed until a different first printing control command is contained in print information that is received later will be described with reference to a flowchart of FIG. 8.

Upon a start of the print control process, print information is received at step S200. Then, the process moves to step S201, where the received print information is spooled. Then, the process moves to step S202, where the print information is parsed and control commands are extracted. Then, the process moves to step S203.

At step S203, a character string of a passthrough-designated control command is searched for. Then, the process moves to step S204.

At step S204, it is judged on the basis of a search result of step S203 whether there exists particular passthrough designation.

The term "particular passthrough designation" as used in this embodiment means a control command which means a control of "continuing to execute a selected first printing control command until a different first printing control command is contained in print information that is received later." Taking the above-described display of FIG. 3 as an embodiment, for example, this may be done in the following manner. A setting item "the same processing is continued until reception of a different instruction" is displayed additionally for a prescribed control command, and whether this processing should be made effective or non-effective is set by checking a check box or leaving it blank.

Figure 9:
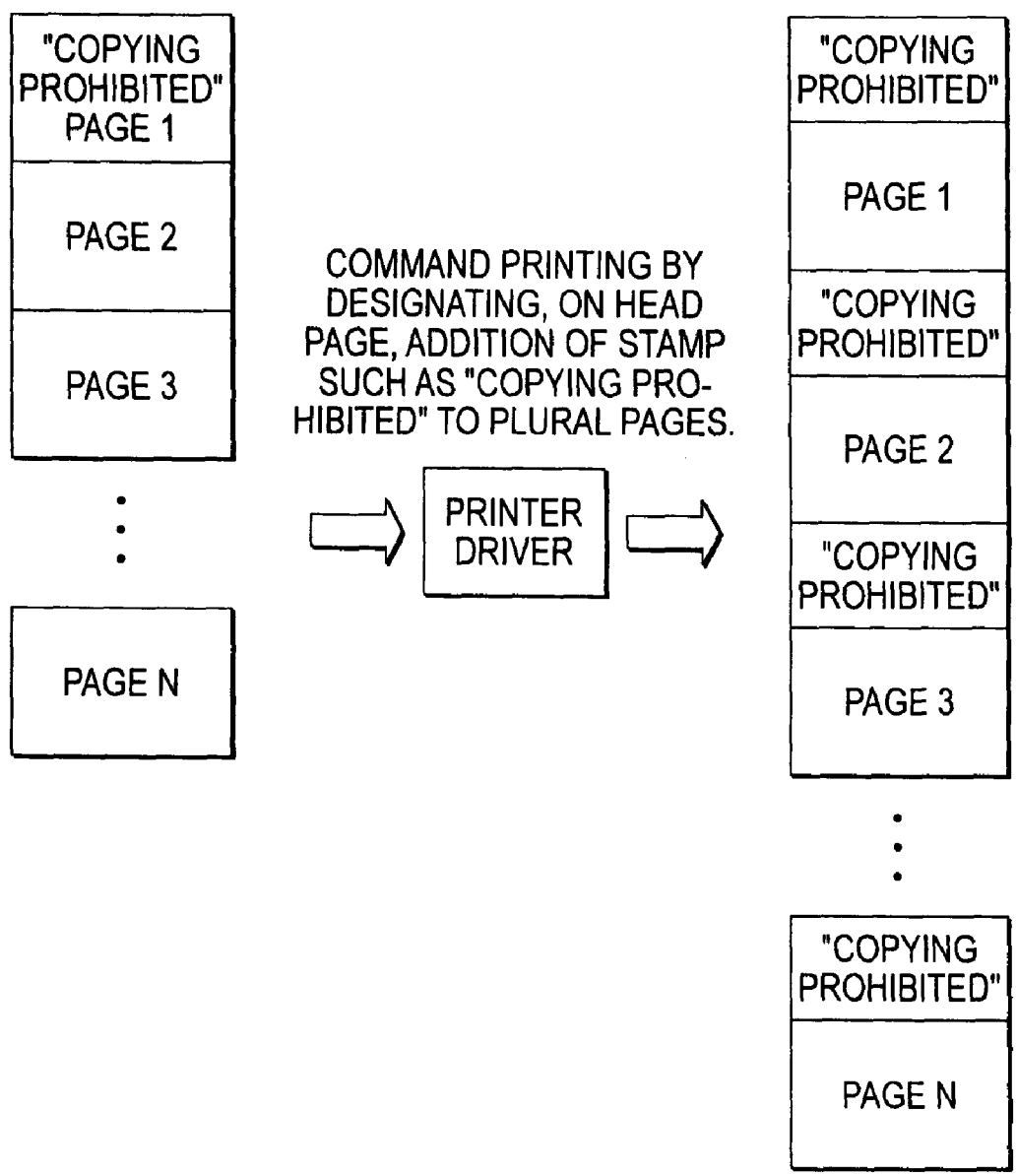
FIG. 9 is an explanatory diagram showing a print result obtained by using the print control process of FIG. 8.

In this embodiment, as shown in FIG. 9, a control command which means a control of printing a phrase "COPYING PROHIBITED" at a prescribed position of each page of print information is contained in the print information and the above-mentioned processing of "continuing the same processing until reception of a different instruction" is made effective for this control command. As a result, "COPYING PROHIBITED" is printed on prescribed pages (in the embodiment of FIG. 9, it is resultantly printed on all pages (page 1 to page N), that is, no different instruction is received until the end of the print information).

At step S205, data to be used in the passthrough process are interpreted. Then, the process moves to step S206, where it is judged whether or not plural pages are designated, that is, whether or not only one page is designated. This is because even if the above-mentioned processing of "continuing the same processing until reception of a different instruction" is effective, it is substantially meaningless in the case where only one page is designated.

The process moves to step S209 if the judgment result of step S205 is "no," and moves to step S207 if the judgment result is "yes."

At step S207, mark information (stamp data) is generated. Then, the process moves to step S208, where processing of assigning the generated stamp data to each page is performed. Then, the process moves to step S209.

At step S209, for the pages to which the stamp data is assigned, the same processing is performed on the basis of the stamp data. In the embodiment of FIG. 9, the phrase "COPYING PROHIBITED" is printed on each page at a prescribed position on the basis of the stamp data.

Printing the phrase "COPYING PROHIBITED" is just an example, and another character string or a picture may be printed. It goes without saying that the content of processing (data processing) of a control command may be another kind of print processing.

Figure 10:
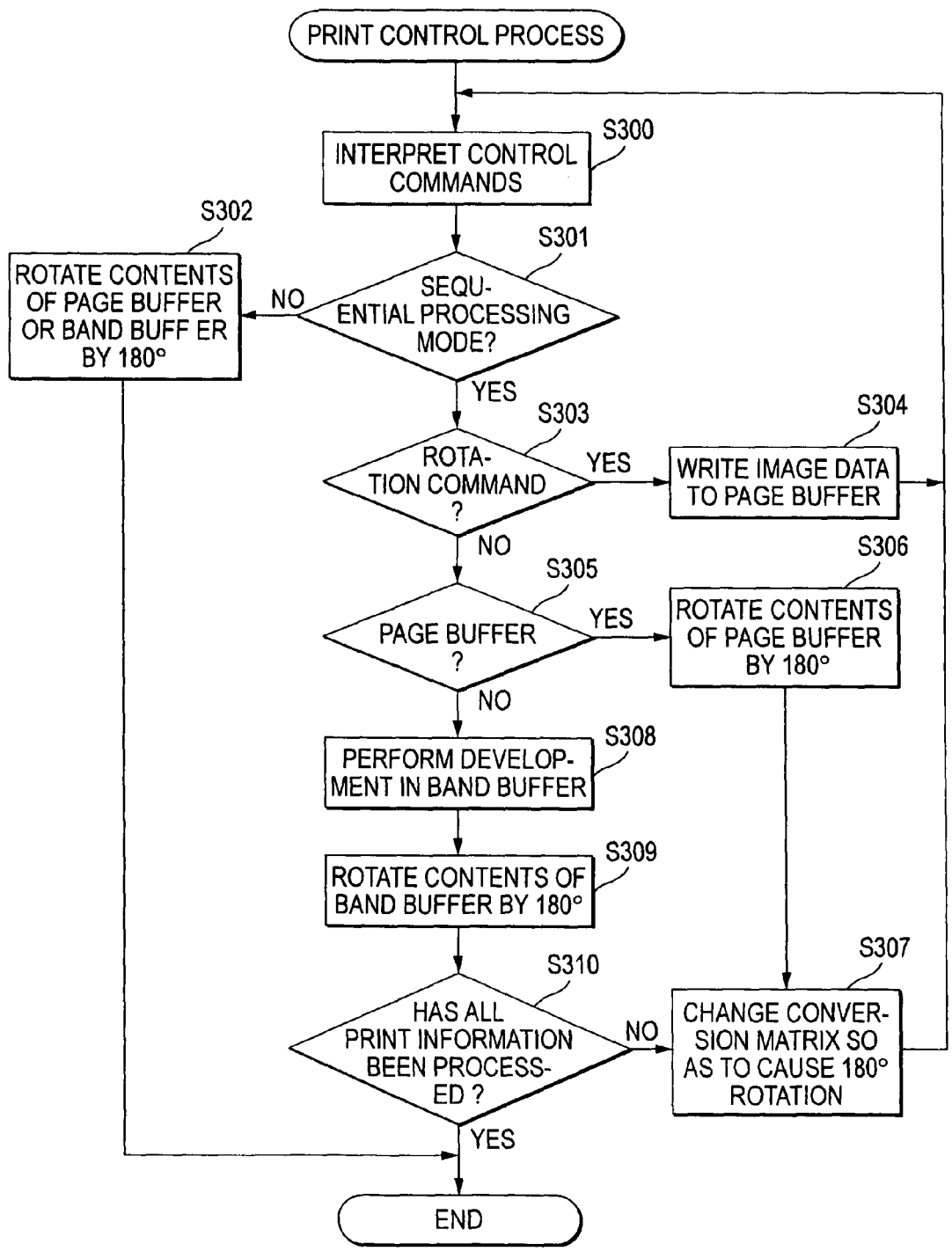
FIG. 10 is a flowchart showing the processing procedure of a further print control process.
Figure 11A:
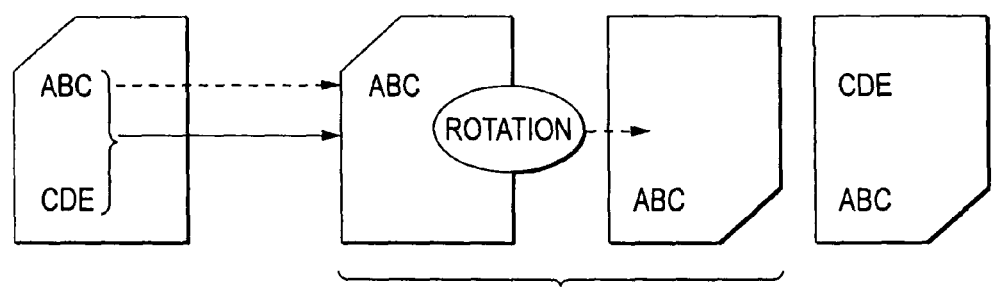
FIGS. 11A and 11B are explanatory diagrams showing print results obtained by using the print control process of FIG. 10.
Figure 11B:
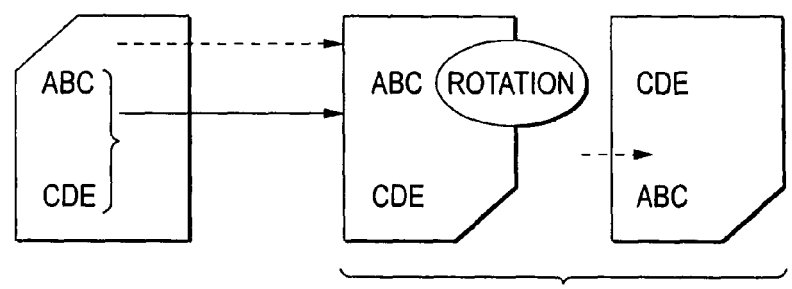

Next, the processing procedure of a print control process in which a selected first printing control command is executed as soon as it is interpreted or when all first printing control commands and second printing control commands contained in print information in a specified range have been interpreted will be described with reference to a flowchart of FIG. 10.

The content of a control command of this embodiment is to rotate image data (bit map data) stored in the RAM 1023 as a memory (an image data storing section) by a prescribed angle (in this embodiment, 180°) from the original image data according to a prescribed condition. However, this aspect of the invention is not limited such a case and control commands having other contents may be executed similarly.

Upon a start of this print control process, control commands are interpreted at step S300. Then, the process moves to step S301.

At step S301, it is judged whether or not a sequential process (i.e., a first printing control command is executed as soon as it is interpreted) should be executed. If the judgment result is "no," the process moves to step S302, where processing of rotating the contents of a page buffer or a band buffer by 180° (corresponds to processing form shown in FIG. 11B) is performed. Then, the process is finished.

The band buffer processing means a method that band-by-band image drawing is performed in such a manner that, for example, elements to be printed and a list indicating their order are generated as pre-processing and a bit map image is generated on a band-by-band basis while the list is referred to. On the other hand, the page buffer processing means a method of generating a bit map image at one time for the page.

Figure 12A:
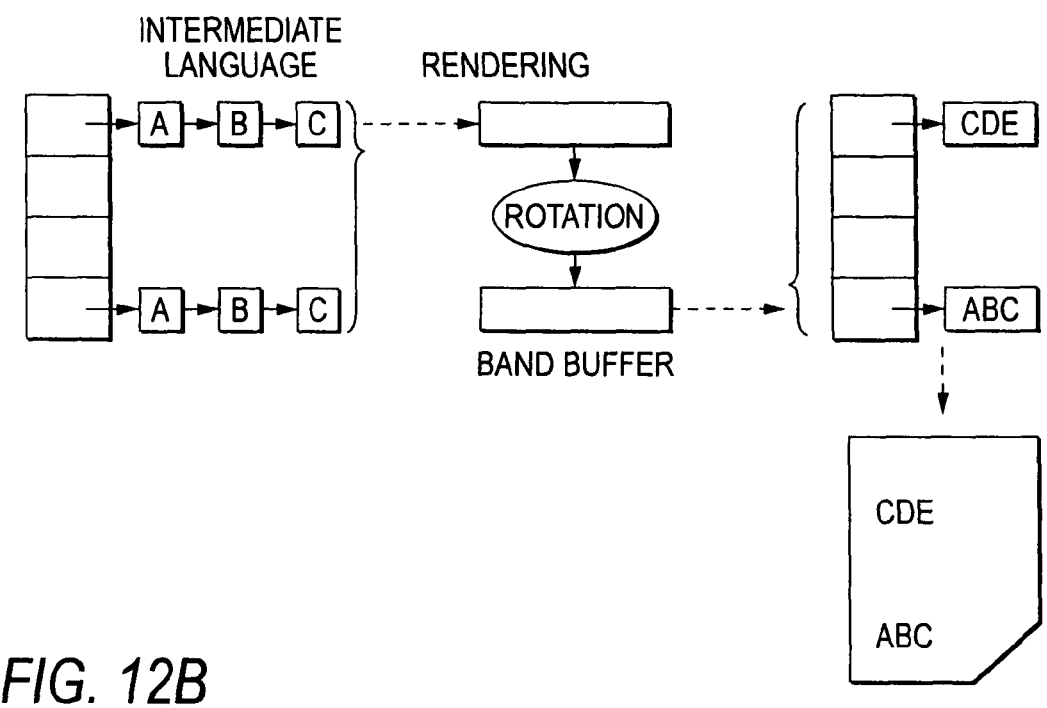
FIG. 12A is an explanatory diagram showing a band buffer processing form and FIG. 12B is an explanatory diagram showing a page buffer processing form.
Figure 12B:
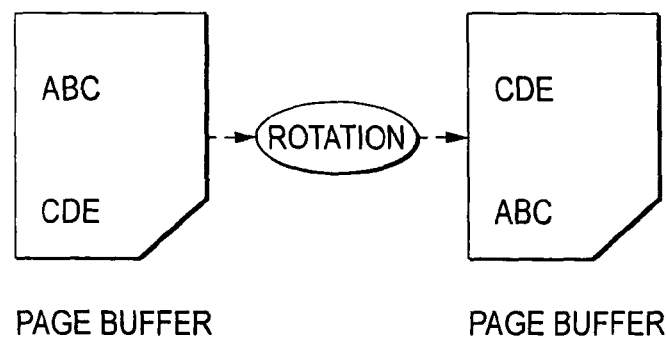

In page buffer rotation processing, rotation processing is performed in the page buffer as shown in FIG. 12B.

In band buffer rotation processing, as shown in FIG. 12A, image data is subjected to rendering after conversion between intermediate languages, subjected to rotation processing, and then stored in the band buffer.

If the judgment result of step S301 is "yes," the process moves to step S303, where it is judged whether or not the control command is a rotation command. If the judgment result is "yes," the process moves to step S304, where image data is written to a page buffer. Then, the process returns to step S300. On the other hand, if the judgment result of step S303 is "no," the process moves to step S305, where it is judged whether or not the buffer is a page buffer. If the judgment result of step S305 is "yes," the process moves to step S306, where processing of rotating the contents of the page buffer by 180° (processing form shown in FIG. 11A) is performed. Then, the process moves to step S307.

At step S307, a conversion matrix is changed so as to cause 180° rotation. Then, the process returns to step S300.

On the other hand, if the judgment result of step S305 is "no," the process moves to step S308, where the image data is developed in a band buffer. Then, the process moves to step S309, where processing of rotating the contents of the band buffer by 180° is performed. Then, the process moves to step S310.

At step S310, it is judged whether or not all print information has been processed. If the judgment result is "yes," the process is finished. If the judgment result is "no," the process moves to step S307.

In this exemplary embodiment, when the print information includes a control command that instructs to perform double-sided printing as the first printing control command, the control command for rotating the image information may serve to perform a coordinate conversion for the image information to be printed on a back surface of a print sheet so as to rotate the image information by 180°.

The invention made by the present inventors has been described above in a specific manner in the form of the embodiment. However, it should be understood that the embodiment disclosed in this specification is just an example in every point and hence the invention is not limited to the disclosed techniques. That is, the technical scope of the invention should not be construed restrictively on the basis of the embodiment and should be construed according to the claims. The invention encompasses techniques that are equivalent to the techniques disclosed in the claims as well as all modifications made within the scope of the claims.

For example, although in the embodiment each print control process is executed by the image processing apparatus (laser printer 100), it may be implemented by a printer driver depending on its content. Furthermore, although in the embodiment the control command extracting section, the passthrough processing control section, the list display, the control command forming section, etc. are formed by the devices and the programs on the image processing apparatus (laser printer 100) side, it is conceivable to implement all or part of the functions by an external apparatus (e.g., a personal computer that is connected to the image processing apparatus).

Where a program is used, it can be provided over a network or provided so as to be stored in a recording medium such as a CD-ROM.

An image processing apparatus according to an exemplary embodiment of the invention can be applied to laser printers, full-color printers, ink-jet printers, facsimile machines, etc.

What is claimed is:

1. An image processing system comprising:
a receiving section that receives print information including at least a first printing control command embedded in a print document and a second printing control command relating to a setting condition for the first printing control command;
a control command extracting section that extracts the first printing control command and the second printing control command from the print information; and
a print executing section that performs the first printing control command according to the setting condition of the second printing control command.

2. The image processing system according to claim 1, wherein the second printing control command further includes information indicating whether the setting condition for the first printing control command is applied.

3. The image processing system according to claim 1, wherein the setting condition for the first control printing command includes a content that instructs to apply the first printing control command to a page, in which the first printing control command is embedded, of the print information.

4. The image processing system according to claim 1, wherein the setting condition for the first printing control command includes a content that instructs to apply the first control printing command to a page, in which the first printing control command is embedded, and subsequent pages of the print information.

5. The image processing system according to claim 1, wherein the setting condition for a first printing control command includes a content that designates a range of the print information to be controlled by the first printing control command.

6. The image processing system according to claim 5, wherein the range of the print information is the whole of the print information or one or more pages of the print information.

7. The image processing system according to claim 1, wherein the setting condition for a first printing control command includes a content that instructs to construct new print information according to the first printing control command.

8. The image processing system according to claim 1, wherein the setting condition for a first printing control command includes a content that instructs to disregard the first printing control command.

9. The image processing system according to claim 1, wherein the setting condition for a first printing control command includes a content that instructs to continue executing the first printing control command until a different first printing control command is included in print information received later.

10. The image processing system according to claim 9, wherein the first printing control command includes a content that instructs add mark information to a page for which the first printing control command is executed continuously.

11. The image processing system according to claim 1, wherein the setting condition for a first printing control includes a content that instructs to execute the selected first printing control command when the first printing control is interpreted.

12. The image processing system according to claim 1, wherein the setting condition for a first printing control command includes a content that instructs to execute the first printing control command when all first printing control commands and all second printing control commands in a specified range of the print information are interpreted.

13. The image processing system according to claim 11, further comprising:
- a developing section that developing the print information into image information to be printed; and
- a memory that stores the image information,
- wherein the first printing control command includes a control command for rotating the image information stored in the memory by an angle under a specific condition.

14. The image processing system according to claim 13, wherein the specific condition is that the print information includes a control command that instructs to perform double-sided printing as the first printing control command; and
- the control command for rotating the image information serves to perform a coordinate conversion for the image information to be printed on a back surface of a print sheet so as to rotate the image information by 180°.

15. The image processing system according to claim 12, further comprising:
- a developing section that developing the print information into image information to be printed; and
- a memory that stores the image information,
- wherein the first printing control command includes a control command for rotating the image information stored in the memory by an angle under a specific condition.

16. The image processing system according to claim 15, wherein the specific condition is that the print information includes a control command that instructs to perform double-sided printing as the first printing control command; and
- the control command for rotating the image information serves to perform a coordinate conversion for the image information to be printed on a back surface of a print sheet so as to rotate the image information by 180°.

17. A method for image processing, comprising:
- receives print information including at least a first printing control command embedded in a print document and a second printing control command relating to a setting condition for the first printing control command;
- extracting the first printing control command and the second printing control command from the print information; and
- performing the first printing control command according to the setting condition of the second printing control command.

18. A computer readable medium storing a program causing a computer to execute image processing, the image processing comprising:
- receives print information including at least a first printing control command embedded in a print document and a second printing control command relating to a setting condition for the first printing control command;
- extracting the first printing control command and the second printing control command from the print information; and
- performing the first printing control command according to the setting condition of the second printing control command.

19. An information processing system comprising:
- a display that displays print information including at least a first printing control command embedded in a print document and a second printing control command relating to a setting condition for the first printing control command;
- a setting condition receiving section that receives the setting condition of the first printing control command; and
- a transmitting section that transmits the first printing control and the second printing control command including the setting condition.

20. A method for information processing, comprising:
- displaying print information including at least a first printing control command embedded in a print document and a second printing control command relating to a setting condition for the first printing control command;
- receiving the setting condition of the first printing control command; and
- transmitting the first printing control and the second printing control command including the setting condition.

21. A computer readable medium storing a program causing a computer to execute information processing, the information processing comprising:
- displaying print information including at least a first printing control command embedded in a print document and a second printing control command relating to a setting condition for the first printing control command;
- receiving the setting condition of the first printing control command; and
- transmitting the first printing control and the second printing control command including the setting condition.

* * * * *